US012451647B2

(12) United States Patent
Chung et al.

(10) Patent No.: US 12,451,647 B2

(45) Date of Patent: Oct. 21, 2025

(54) CONNECTOR

(71) Applicant: BIZLINK INTERNATIONAL CORP., New Taipei (TW)

(72) Inventors: Yi-Hsing Chung, New Taipei (TW); Shi-Jung Chen, New Taipei (TW); Chih-Wen Fan, New Taipei (TW)

(73) Assignee: BIZLINK INTERNATIONAL CORP., New Taipei (TW)

( * ) Notice: Subject to any disclaimer, the term of this patent is extended or adjusted under 35 U.S.C. 154(b) by 395 days.

(21) Appl. No.: 18/059,977

(22) Filed: Nov. 29, 2022

(65) Prior Publication Data

US 2024/0145990 A1 May 2, 2024

(30) Foreign Application Priority Data

Oct. 26, 2022 (TW) ................................. 111140751

(51) Int. Cl.
*H01R 13/62* (2006.01)
*H01R 13/627* (2006.01)
*H01R 13/633* (2006.01)

(52) U.S. Cl.
CPC ..... *H01R 13/6275* (2013.01); *H01R 13/6335* (2013.01)

(58) Field of Classification Search
CPC ............ H01R 13/6275; H01R 13/6335; H01R 13/639; H01R 13/46; H01R 13/635; H01R 24/00
See application file for complete search history.

(56) References Cited

U.S. PATENT DOCUMENTS

| | | | | |
|---|---|---|---|---|
| 7,473,124 | B1 * | 1/2009 | Briant | H01R 13/629 439/352 |
| 7,534,125 | B1 * | 5/2009 | Schroll | H01R 13/6275 439/157 |
| 7,572,138 | B1 * | 8/2009 | Wu | H01R 13/6275 439/352 |
| 10,547,142 | B1 * | 1/2020 | Henry | H01R 12/79 |
| 2009/0017666 | A1 * | 1/2009 | Lim | H05K 7/1405 439/328 |
| 2009/0325417 | A1 * | 12/2009 | Ko | H01R 13/502 439/350 |
| 2011/0294334 | A1 * | 12/2011 | Phillips | G02B 6/4201 439/357 |

(Continued)

FOREIGN PATENT DOCUMENTS

| | | | | |
|---|---|---|---|---|
| CN | 211743448 U | | 10/2020 | |
| CN | 115021026 | * | 9/2022 | H01R 12/771 |

(Continued)

*Primary Examiner* — Truc T Nguyen
(74) *Attorney, Agent, or Firm* — CKC & Partners Co., LLC

(57) ABSTRACT

A connector includes a base, a latch, and a first axle element. The latch is disposed on the base. The latch includes a main portion, a front-left arm, a front-right arm, a back-left arm, and a back-right arm, wherein each of the front end of the front-left arm and the front end of the front-right arm has a hook-shaped structure, and each of the back-left arm and the back-right arm has a hole. The first axle element is pivoted to the hole of the back-left arm and the base. The back-left arm of the latch is located along the lengthwise direction of the front-left arm, and the back-left arm and the front-left arm are connected by a connecting structure.

16 Claims, 5 Drawing Sheets

(56) References Cited

U.S. PATENT DOCUMENTS

| | | | | |
|---|---|---|---|---|
| 2018/0233855 | A1 | 8/2018 | Phillips et al. | |
| 2022/0190516 | A1 | 6/2022 | Phillips et al. | |
| 2024/0072489 | A1* | 2/2024 | Chen .................. | H01R 13/6275 |

FOREIGN PATENT DOCUMENTS

| | | | |
|---|---|---|---|
| TW | M614874 | U | 7/2021 |
| TW | M628977 | U | 7/2022 |

* cited by examiner

CONNECTOR

CROSS-REFERENCE TO RELATED APPLICATIONS

This application claims priority to Taiwan Application Serial Number 111140751, filed Oct. 26, 2022, which is herein incorporated by reference.

BACKGROUND

Field of Invention

The present disclosure relates to a connector. More particularly, the present disclosure relates to a connector including a latch.

Description of Related Art

It is a well-known technique to provide latches on cable end high-speed connectors (such as MCIO, NEARSTACK, MINISAS, etc.) inside a server to engage with board connectors.

Take the cable end connector of U.S. Pat. No. 10,547,142 as an example, two hook fixing arms may be disposed on the left and right sides of the latch respectively. During application, the hook at the end of the latch is buckled and fixed with the through hole of the housing of the board connector. When the cable end connector and the board connector need to be released from each other, the latch can be pulled by a pull tab to enable the hook at the end of the latch to move down and be separated from the through hole of the housing of the board connector.

However, if the user does not use the pull tab correctly but directly pulls the cable of the connector, since the latch has not yet moved dawn, the central portion of the latch will be subjected to force to cause plastic deformation and the risk of failure.

SUMMARY

In view of this, one object of the present disclosure is to provide a connector that can solve the above problems.

In order to achieve the aforementioned purpose, according to some embodiments of the present disclosure, a connector includes a base, a latch, and a first axle element. The latch is disposed on the base and may have a certain degree of elastic deformation. The latch includes a main portion, a front-left arm, a front-right arm, a back-left arm, and a back-right arm. Each of the front end of the front-left arm and the front end of the front-right arm has a hook-shaped structure, and each of the back-left arm and the back-right arm has a hole. The first axle element is pivoted to the hole of the back-left arm and the base. The back-left arm is located along a lengthwise direction of the front-left arm, and the back-left arm and the front-left arm are connected by a vertical wall.

In some embodiments, the front-left arm and the back-left arm of the latch are aligned with each other and are arranged in a straight line.

In some embodiments, an axis direction of the first axle element is perpendicular to the straight line.

In some embodiments, the base has a recess, and the first axle element is located in the recess.

In some embodiments, the connector further includes a second axle element that is pivoted to the hole of the back-right arm and the base.

In some embodiments, the front-right arm and the back-right arm of the latch are aligned with each other and are arranged in a straight line.

In some embodiments, an axis direction of the second axle element is perpendicular to the straight line.

In some embodiments, the base has a recess, and the second axle element is located in the recess.

In some embodiments, the connector further includes a pull tab, and one end of the pull tab is connected to the base, and said end of the pull tab is located between the back-left arm and the back-right arm of the latch.

In some embodiments, a lengthwise direction of the pull tab is perpendicular to an axis direction of the first axle element.

According to some embodiments of the present disclosure, a connector includes a base, a latch, and a first axle element. The latch is disposed on the base and may have a certain degree of elastic deformation. The latch includes a main portion, a front-left arm, a front-right arm, a back-left arm, and a back-right arm. Each of the front end of the front-left arm and the front end of the front-right arm has a hook-shaped structure, and each of the back-left arm and the back-right arm has a hole. The first axle element is pivoted to the hole of the back-left arm and the base. The back-left arm is located along a lengthwise direction of the front-left arm, and the front-left arm and the back-left arm of the latch are aligned with each other and are arranged in a straight line.

In some embodiments, an axis direction of the first axle element is perpendicular to the straight line.

In some embodiments, the base has a recess, and the second axle element is located in the recess.

In some embodiments, the connector further includes a pull tab, and one end of the pull tab is connected to the base, and said end of the pull tab is located between the back-left arm and the back-right arm of the latch.

In some embodiments, a lengthwise direction of the pull tab is perpendicular to an axis direction of the first axle element.

In summary, in the aforementioned embodiments of the present disclosure, since the connector includes the latch and the first axle element that is pivoted to the hole of the back-left arm of the latch and the base, when the connector is forced to be removed from a mating connector (e.g., a board connector), the force on the latch can be transmitted from the hook-shaped structure of the front-left arm engaged with the mating connector to the first axle element through the back-left arm. Such a configuration may prevent the force transmitting to the central portion of the latch, thereby preventing the deformation and damage of the latch to extend the service life of the connector. In addition, the back-left arm and the front-left arm of the latch can transmit the force to the first axle element, and thus there is no need to have a structure that turns to the base, which is beneficial to the flattening design of the base.

BRIEF DESCRIPTION OF THE DRAWINGS

Aspects of the present disclosure are best understood from the following detailed description when read with the accompanying figures. It is noted that, in accordance with the standard practice in the industry, various features are drawn accurately according to the real scale, so the details such as the proportion and relative relationship of each element should be regarded as a part of the content of the present disclosure.

DETAILED DESCRIPTION

Figure 1:
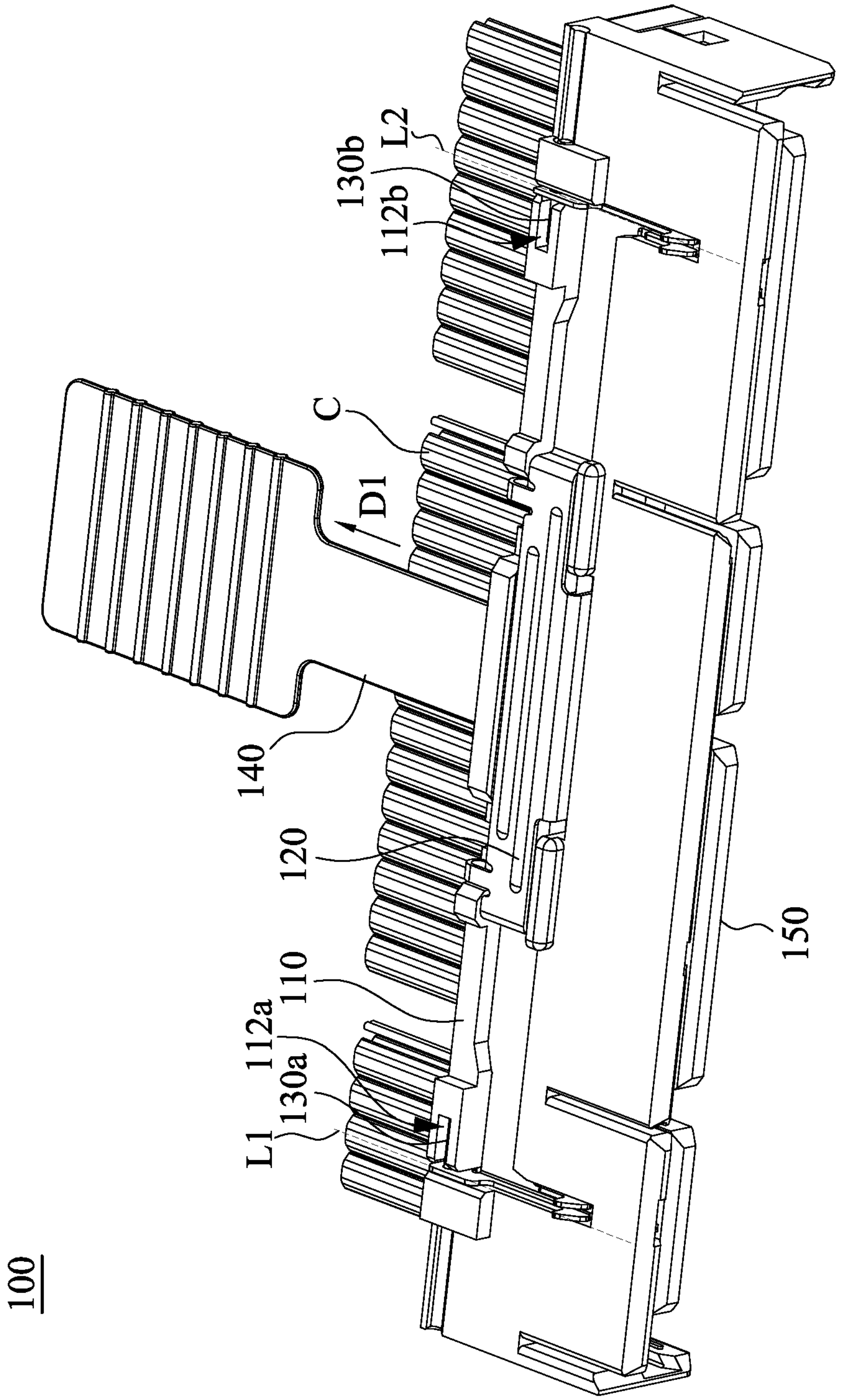
FIG. 1 is a perspective view of a connector according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
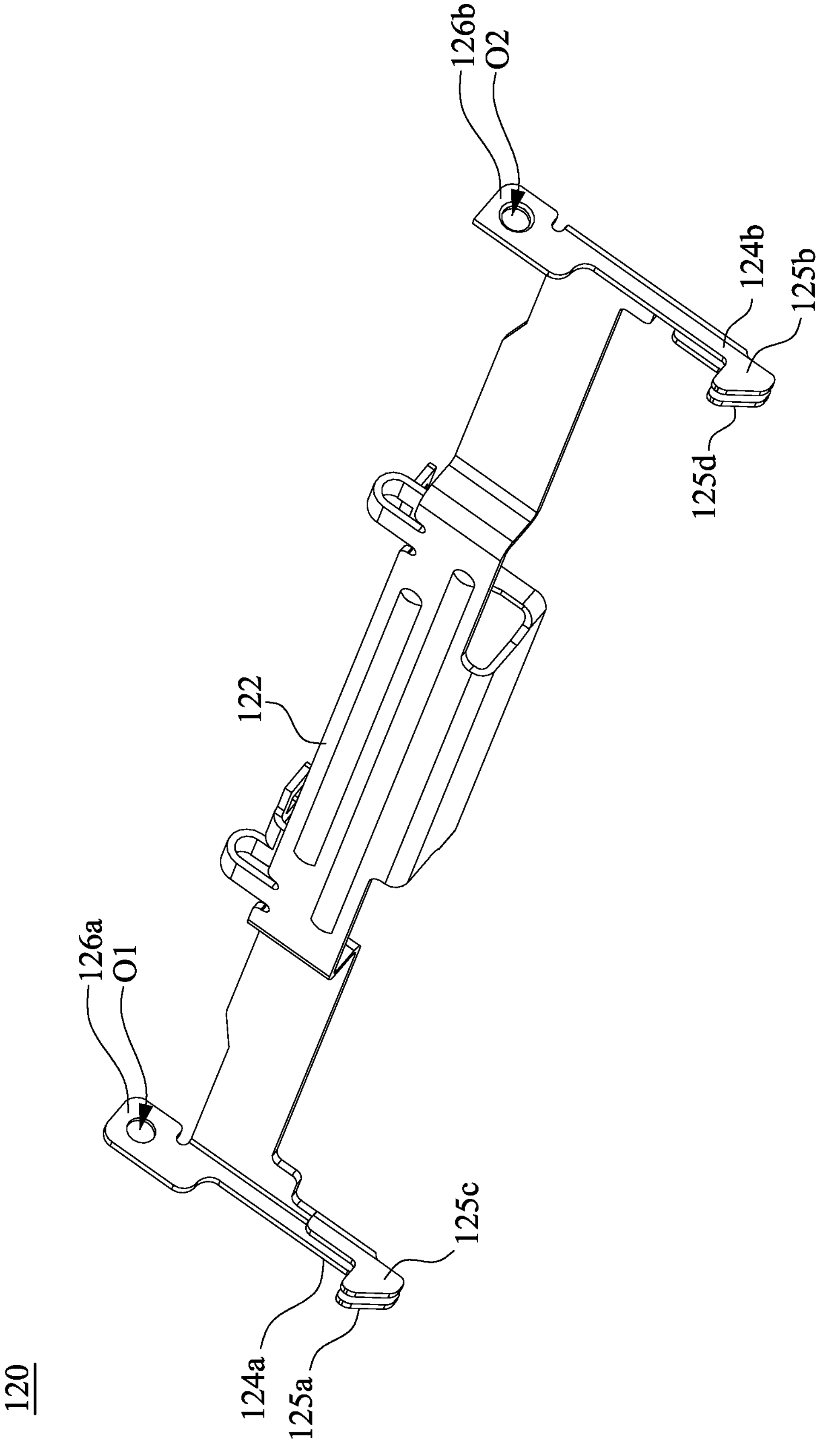
FIG. 2 is a perspective view of a latch of the connector of FIG. 1.

FIG. 1 is a perspective view of a connector 100 according to one embodiment of the present disclosure. FIG. 2 is a perspective view of a latch 120 of the connector 100 of FIG. 1. As shown in FIG. 1 and FIG. 2, the connector 100 includes a base 110, the latch 120, and a first axle element 130*a*. The connector 100 may be a cable end connector for high speed connection and high frequency connection. For example, the connector 100 may serve as the cable end connector of a server. The base 110 may be an insulator, such as plastic, which can provide supporting force.

The latch 120 includes a main portion 122, a front-left arm 124*a*, a front-right arm 124*b*, a back-left arm 126*a*, and a back-right arm 126*b*. The front end of the front-left arm 124*a* has a hook-shaped structure 125*a*, and the front end of the front-right arm 124*b* has a hook-shaped structure 125*b*. Moreover, the back-left arm 126*a* has a hole O1, and the back-right arm 126*b* has a hole O2. Each of the holes O1 and O2 is through hole, and the entirety of the latch 120 is formed by stamping or folding or bending process from a single sheet metal material, or say, the latch 120 is one-piece formed by a single metal sheet.

In some embodiments, the front-left arm 124*a* and the front-right arm 124*b* are disposed in a symmetrical arrangement relative to the main portion 122, and the back-left arm 126*a* and the back-right arm 126*b* are disposed in a symmetrical arrangement relative to the main portion 122, too. The first axle element 130*a* is cylindrical, and may be pivoted.

In some embodiments, the connector 100 further includes a pull tab 140. The connector 100 has a lengthwise direction D1 and may have different widths. A width of the pull tab 140 away from the base 110 may be greater than another width of the pull tab 140 adjacent to the base 110, which is beneficial to user's operation, such as applying a pulling force to the pull tab 140 to enable the connector 100 to separate from a mating connector. One end of the pull tab 140 is connected to the base 110, and said end of the pull tab 140 connected to the base 110 may be located between the back-left arm 126*a* and the back-right arm 126*b* of the latch 120.

Furthermore, the connector 100 may further include a printed circuit board 150 and a cable C. The cable C can transmit high frequency signals. The cable C is electrically connected to the printed circuit board 150, and the printed circuit board 150 may be electrically connected to the mating connector.

Figure 3:
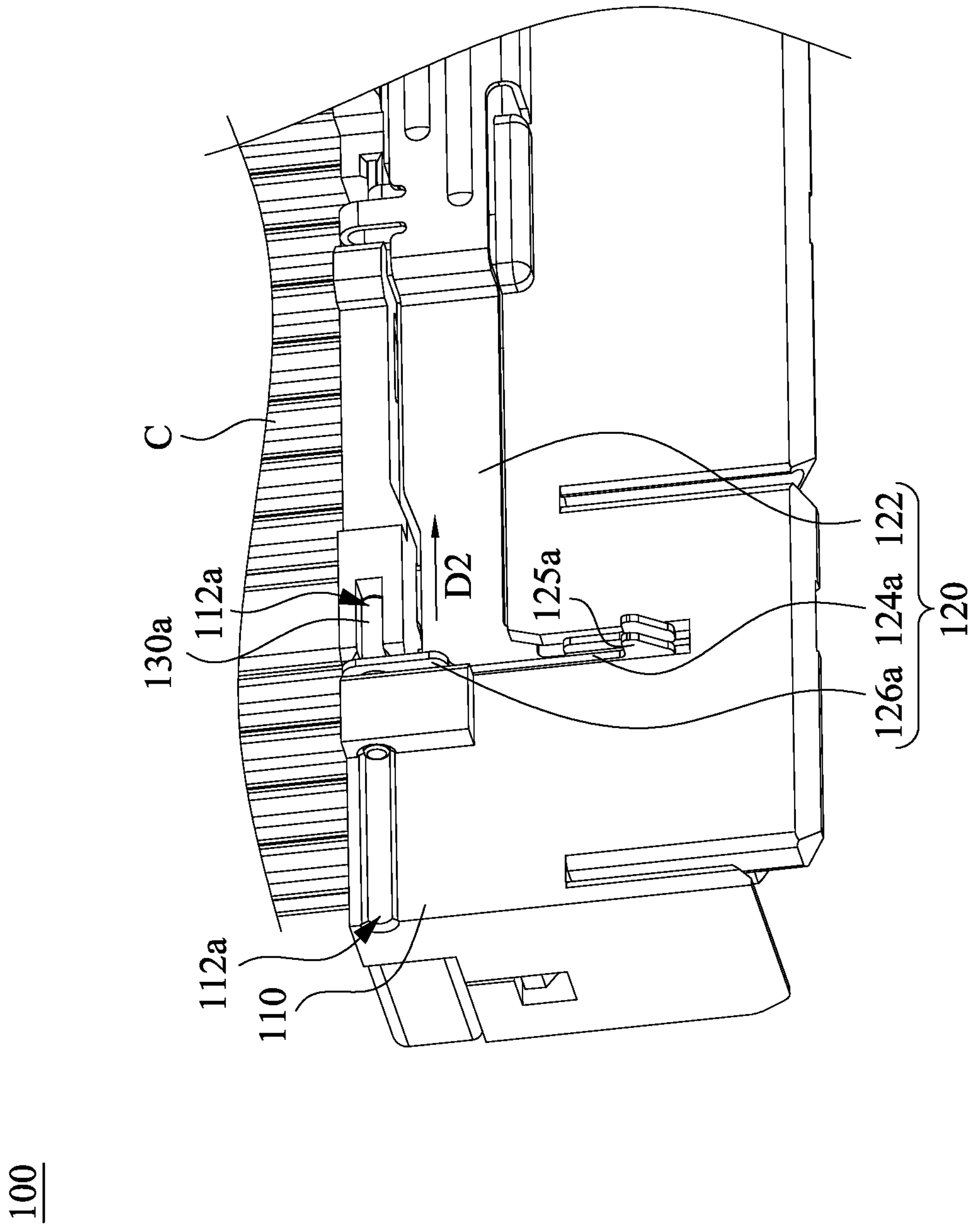
FIG. 3 is a partially enlarged view of the connector of FIG. 1.
Figure 4:
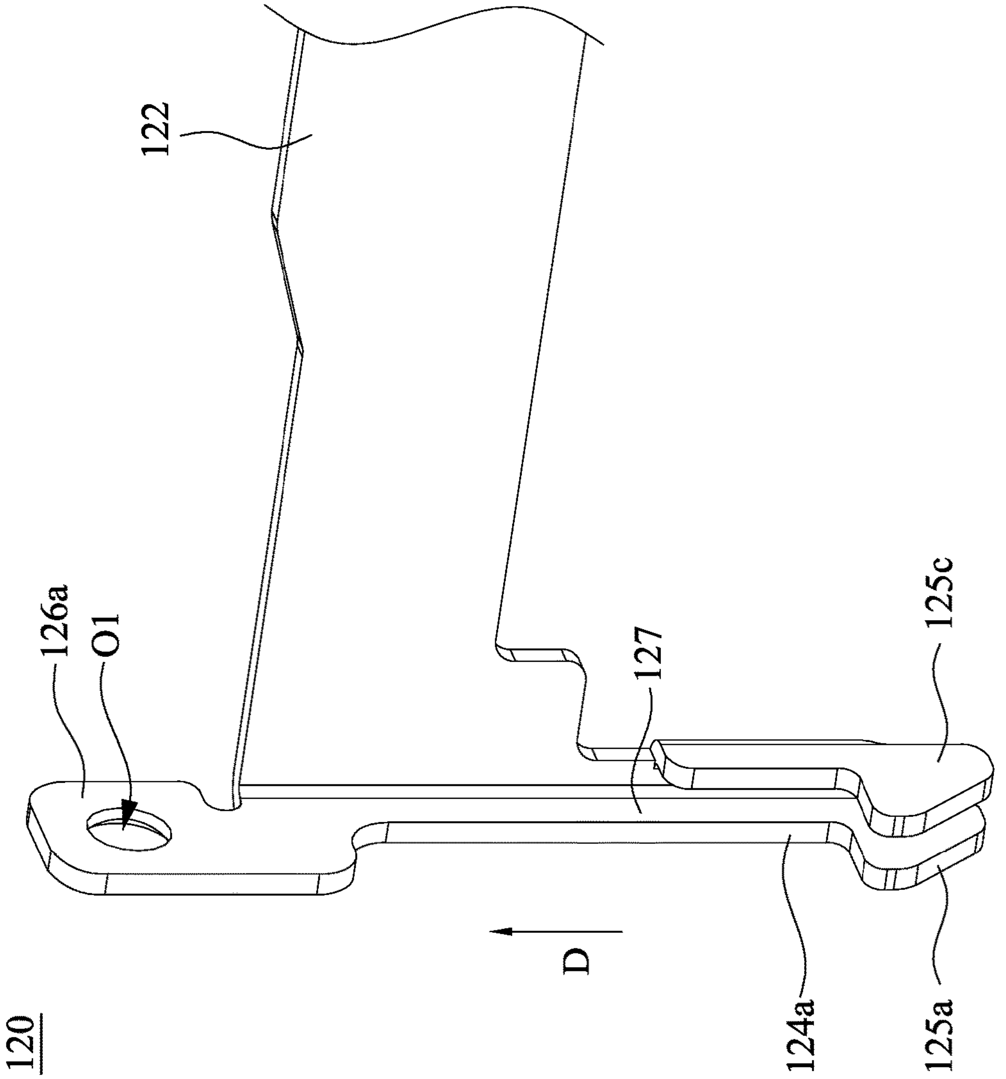
FIG. 4 is a partially enlarged view of the latch of FIG. 2.

FIG. 3 is a partially enlarged view of the connector 100 of FIG. 1. FIG. 4 is a partially enlarged view of the latch 120 of FIG. 2. As shown in FIG. 3 and FIG. 4, the latch 120 is disposed on the base 110. The first axle element 130*a* is pivoted to the hole O1 of the back-left arm 126*a* and the base 110. In this embodiment, the first axle element 130*a* may pass through the hole O1 of the back-left arm 126*a* and is covered and positioned by a portion of the base 110. Further, the back-left arm 126*a* is located along the lengthwise direction D1 of the front-left arm 124*a*, and the back-left arm 126*a* and the front-left arm 124*a* of the latch 120 are connected by a connecting structure 127 that extends along the lengthwise direction D1. In this embodiment, the connecting structure 127 comprises at least a vertical wall, which is not folded or bent to maximize the force capable of deforming the vertical wall while transmitting stress. Specifically, the vertical wall does not include a turning structure formed by folding or bending along an axis direction D2 or a turning structure formed by folding or bending along a height direction. The aforementioned height direction is perpendicular to the lengthwise direction D1 and the axis direction D2. The back-left arm 126*a* and the hook-shaped structure 125*a*, 125*c* have no offset on at least two axes substantially. Or say, the back-left arm 126*a* and the hook-shaped structure 125*a*, 125*c* are approximately aligned in at least two axes.

In other words, the latch 120 from the back-left arm 126*a* to the front-left arm 124*a* presents a straight line in the lengthwise direction D1. That is, there is no other folding or bending structure between the back-left arm 126*a* and the front-left arm 124*a*, and the back-left arm 126*a* and the front-left arm 124*a* are substantially arranged along a straight line. There is no deformed portion between the back-left arm 126*a* and the front-left arm 124*a*, such that the bottom surface of the back-left arm 126*a* and the bottom surface of the front-left arm 124*a* define a continuous plane.

Specifically, since the connector 100 includes the latch 120 and the first axle element 130*a* that is pivoted to the hole O1 of the back-left arm 126*a* of the latch 120 and the base 110, when the connector 100 is forced to be removed from a mating connector (e.g., a board connector), the force on the latch 120 can be transmitted from the hook-shaped structure 125*a* of the front-left arm 124*a* engaged with the mating connector to the first axle element 130*a* through the back-left arm 126*a*. Such a configuration may prevent the force transmitting to the central portion (e.g., the main portion 122) of the latch, thereby preventing the deformation and damage of the latch 120 to extend the service life of the connector 100. In addition, the front-left arm 124*a* and the back-left arm 126*a* of the latch 120 can transmit the force to the first axle element 130*a*, and thus there is no need to have a structure that turns to the base 110, which is beneficial to the flattening design of the base 110.

In this embodiment, the base 100 may further have a recess 112*a*. The recess 112*a* is a strip shape and extends along the axis direction D2 of the first axle element 130*a*. The first axle element 130*a* is located in the recess 112*a*, such that the first axle element 130*a* can be positioned in the base 110. Moreover, the lengthwise direction D1 of the pull tab 140 of FIG. 1 may be perpendicular to the axis direction D2. Such a configuration can ensure that the force applied to the pull tab 140 along the lengthwise direction D1 is transmitted to the first axle element 130*a* and the base 110, thereby preventing the distortion and deformation of the latch 120 to extend the service life.

Referring back to FIG. 1 and FIG. 2, the connector 100 further includes a second axle element 130*b*. The appearance of the second axle element 130*b* is similar to that of the first axle element 130*a*. The second axle element 130*b* is pivoted to the hole O2 of the back-right arm 126*b* of the latch 120 and the base 110. In this embodiment, the second axle element 130*b* may pass through the hole O2 of the back-right arm 126*b* and is covered and positioned by a portion of the base 110. Further, the base 100 may further have a recess 112*b*. The recess 112*b* is a strip shape and extends along the axis direction of the second axle element 130*b* which is the same as the axis direction D2 of the first axle element 130*a* of FIG. 3. The second axle element 130*b* is located in the recess 112*b*, such that the second axle element 130*b* can be positioned in the base 110. The second axle element 130*b* and the first axle element 130*a* may be disposed in a symmetrical arrangement, and the recess 112*b* and the recess 112*a* may be disposed in a symmetrical arrangement.

The arrangement and functions of the front-right arm 124*b* and the back-right arm 126*b* of the latch 120, the second axle element 130*b*, and the recess 112*b* of the base 110 are respectively similar to those of the front-left arm 124*a* and the back-left arm 126*a* of the latch 120, the first axle element 130*a*, and the recess 112*a* of the base 110, and will not be repeated in the following description.

It is to be noted that the connection relationships, the materials, and the advantages of the elements described above will not be repeated in the following description. In the following description, the operation status of the connector 100 will be explained.

Figure 5:
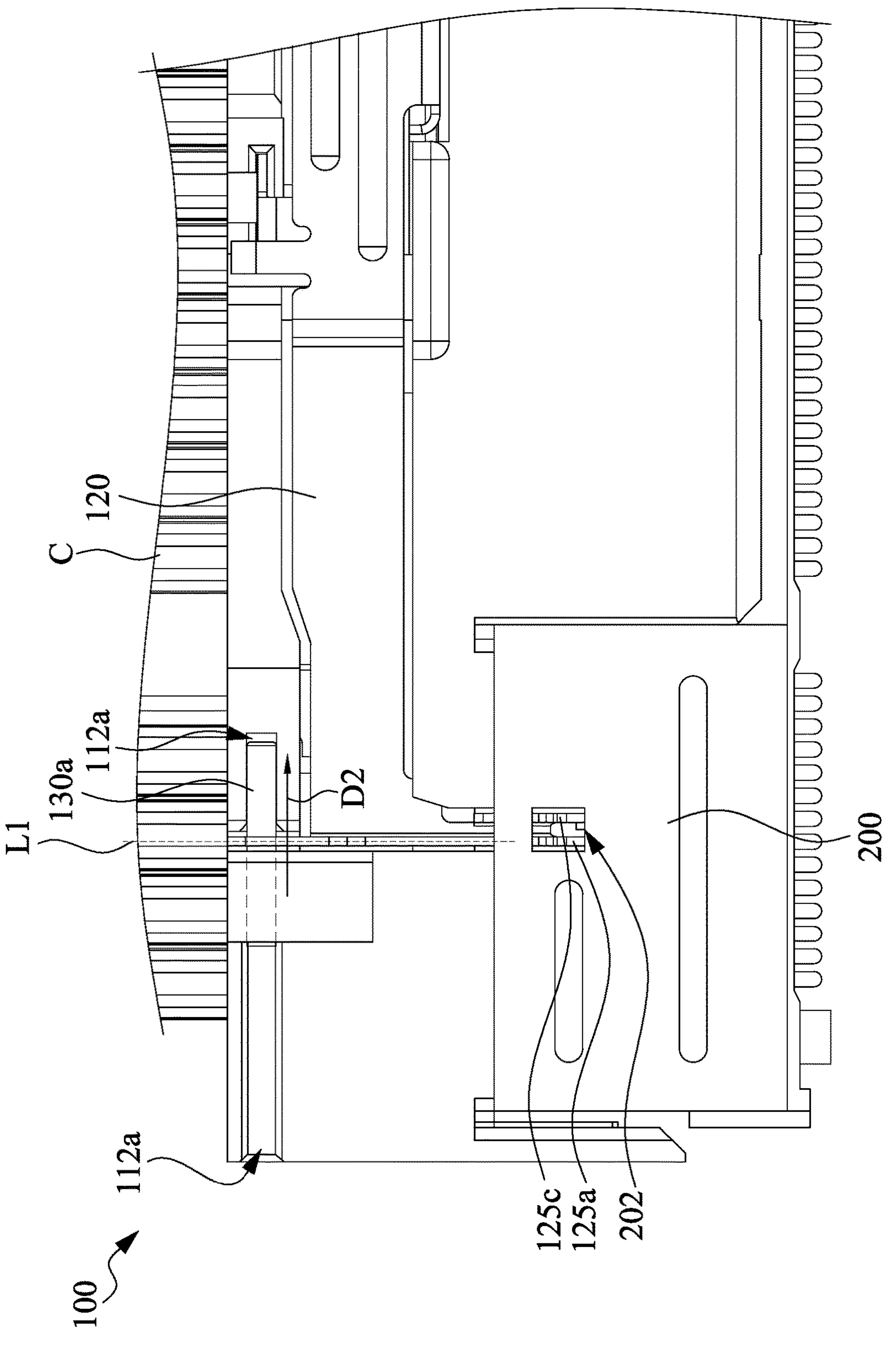
FIG. 5 is a side view of the connector of FIG. 1 when being coupled to a mating connector.

FIG. 5 is a side view of the connector 100 of FIG. 1 when being coupled to a mating connector 200. As shown in FIG. 2 and FIG. 5, the mating connector 200 may be a board connector, but the present disclosure is not limited in this regard. When the connector 100 is coupled to the mating connector 200, the hook-shaped structure 125*a* of the front-left arm 124*a* of the latch 120 of the connector 100 can be engaged with an opening 202 of the mating connector 200, such that the connector 100 is positioned on the mating connector 200, and the printed circuit board 150 (see FIG. 1) of the connector 100 is electrically connected to the mating connector 200.

In this embodiment, the front-left arm 124*a* and the back-left arm 126*a* of the latch 120 are aligned with each other and are arranged in a straight line L1. An intersection point between the first axle element 130*a* and the back-left arm 126*a* of the latch 120 is located on the straight line L1, which can effectively transmit the force to the first axle element 130*a* when the pull tab 140 of FIG. 1 is pulled in the lengthwise direction D1, thereby preventing the deformation and damage of the latch 120 to extend the service life of the latch 120. In addition, in this embodiment, the axis direction D2 of the first axle element 130*a* may be perpendicular to the straight line L1, which can further ensure that the base 110 merely receives the upward force (the lengthwise direction D1 of the pull tab 140). As a result, the hook-shaped structure 125*a* of the front-left arm 124*a* of the latch 120 can separate from the opening 202 of the mating connector 200 with less effort, and thus the connector 100 and the mating connector 200 are separated from each other.

As shown in FIG. 1 and FIG. 2, similarly, the front-right arm 124*b* and the back-right arm 126*b* of the latch 120 are aligned with each other and are arranged in a straight line L2. An intersection point between the second axle element 130*b* and the back-right arm 126*b* of the latch 120 is located on the straight line L2, which can effectively transmit the force to the second axle element 130*b* when the pull tab 140 is pulled in the lengthwise direction D1, thereby preventing the deformation and damage of the latch 120 to extend the service life of the latch 120. In addition, in this embodiment, the axis direction of the second axle element 130*b* is perpendicular to the straight line L2, which can further ensure that the base 110 merely receives the upward force (the lengthwise direction D1 of the pull tab 140). As a result, the hook-shaped structure 125*b* of the front-right arm 124*b* of the latch 120 can separate from another opening of the mating connector 200 (see FIG. 5) with less effort, and thus the connector 100 and the mating connector 200 are separated from each other.

In some embodiments, the front-left arm 124*a* of the latch 120 of the connector 100 may have plural parallel hook-shaped structures 125*a* and 125*c* that are integrally formed, and the front-right arm 124*b* of the latch 120 may have plural parallel hook-shaped structures 125*b* and 125*d* that are integrally formed. The hook-shaped structure 125*c* at the inner side and the hook-shaped structure 125*a* at the outer side are arranged side by side (e.g., in a parallel arrangement). The hook-shaped structure 125*d* and the hook-shaped structure 125*b* of the front-right arm 124*b* are arranged side by side, and the hook-shaped structure 125*d* is closer to the inner side. The hook-shaped structures 125*c* and 125*d* are closer to the inner side than the hook-shaped structures 125*a* and 125*b*. As a result of such a configuration, when the connector 100 is coupled to the mating connector 200 of FIG. 2, the hook-shaped structures 125*a* and 125*c* of the front-left arm 124*a* of the latch 120 can be both engaged with the opening 202 of the mating connector 200, and the hook-shaped structures 125*b* and 125*d* of the front-right arm 124*b* can be both engaged with another opening of the mating connector 200, thereby improving connecting feel and stability.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A connector, comprising:

a base;

a latch disposed on the base and comprising a main portion, a front-left arm, a front-right arm, a back-left arm, and a back-right arm, wherein each of a front end of the front-left arm and a front end of the front-right arm has a hook-shaped structure, and each of the back-left arm and the back-right arm has a hole, and the front-right arm, the back-right arm, and the hole of the back-right arm are coplanar; and a first axle element pivoted to the hole of the back-left arm and the base;

wherein the back-left arm is located along a lengthwise direction of the front-left arm, and the back-left arm and the front-left arm are connected by a-vertical wall.

2. The connector of claim 1, wherein the front-left arm and the back-left arm of the latch are aligned with each other and are arranged in a straight line.

3. The connector of claim 2, wherein an axis direction of the first axle element is perpendicular to the straight line.

4. The connector of claim 1, wherein the base has a recess, and the first axle element is located in the recess.

5. The connector of claim 1, further comprising:

a second axle element pivoted to the hole of the back-right arm and the base.

6. The connector of claim 5, wherein the front-right arm and the back-right arm of the latch are aligned with each other and are arranged in a straight line.

7. The connector of claim 6, wherein an axis direction of the second axle element is perpendicular to the straight line.

8. The connector of claim 5, wherein the base has a recess, and the second axle element is located in the recess.

9. The connector of claim 1, further comprising:

a pull tab, wherein one end of the pull tab is located between the back-left arm and the back-right arm of the latch.

10. The connector of claim 9, wherein a lengthwise direction of the pull tab is perpendicular to an axis direction of the first axle element.

11. A connector, comprising:

a base;

a latch disposed on the base and comprising a main portion, a front-left arm, a front-right arm, a back-left arm, and a back-right arm, wherein each of a front end of the front-left arm and a front end of the front-right arm has a hook-shaped structure, and each of the back-left arm and the back-right arm has a hole, and the front-right arm, the back-right arm, and the hole of the back-right arm are coplanar; and a first axle element pivoted to the hole of the back-left arm and the base;

wherein the back-left arm is located along a lengthwise direction of the front-left arm, and the front-left arm and the back-left arm of the latch are aligned with each other and are arranged in a straight line.

12. The connector of claim 11, wherein an axis direction of the first axle element is perpendicular to the straight line.

13. The connector of claim 11, wherein the base has a recess, and the first axle element is located in the recess.

14. The connector of claim 11, further comprising:

a pull tab, wherein one end of the pull tab is located between the back-left arm and the back-right arm of the latch.

15. The connector of claim 14, wherein a lengthwise direction of the pull tab is perpendicular to an axis direction of the first axle element.

16. The connector of claim 1, wherein no other folding or bending structure is between the back-left arm and the front-left arm.

* * * * *